Feb. 10, 1931.   M. C. SPENCER   1,792,449
FLUID CONDUCTOR MOTOR
Filed July 27, 1927   3 Sheets-Sheet 1

Inventor,
Millard Cole Spencer,
By Samuel W. Balch
Attorney.

Feb. 10, 1931.  M. C. SPENCER  1,792,449
FLUID CONDUCTOR MOTOR
Filed July 27, 1927  3 Sheets-Sheet 2

Inventor,
Millard Cole Spencer,
By Emmuel W. Balch
Attorney.

Feb. 10, 1931.  M. C. SPENCER  1,792,449
FLUID CONDUCTOR MOTOR
Filed July 27, 1927   3 Sheets-Sheet 3

Inventor,
Millard Cole Spencer,
By
Attorney.

Patented Feb. 10, 1931

1,792,449

UNITED STATES PATENT OFFICE

MILLARD COLE SPENCER, OF EAST ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY

FLUID-CONDUCTOR MOTOR

Application filed July 27, 1927. Serial No. 208,758.

This invention relates to motors in which an electrically conductive fluid is caused to flow in a channel by passing electric current transverse to the direction of flow of the fluid in the presence of an alternating magnetic field. One object of the invention is to apply the principle to the pumping of fluids which are not electrically conductive. Further objects are to provide an effective pumping and compressing means which is silent in operation and which may be used for liquids which would corrode such materials as are suitable for the construction of cylinder walls and pistons between which a leak-tight sliding joint would need to be maintained, and also for liquids which would interfere with lubrication or which would be contaminated by oil. Such objects are attained by the elimination of mechanically moving solid parts which need to slide on one another. Further objects are to provide a pump which will operate with little attention and in which the fluids connected with its operation may be located in a sealed container without the use of stuffing boxes through which parts need to move into and out of the container, as is desirable in the case of refrigerating machinery which employs fluids the leakage of which would be objectionable.

In the accompanying three sheets of drawings which form a part of this description, Figure 1 is a section through the motor on the line I—I of Fig. 2 showing one means for effecting the pumping of a nonconducting fluid through the agency of a conducting fluid.

Figure 1:
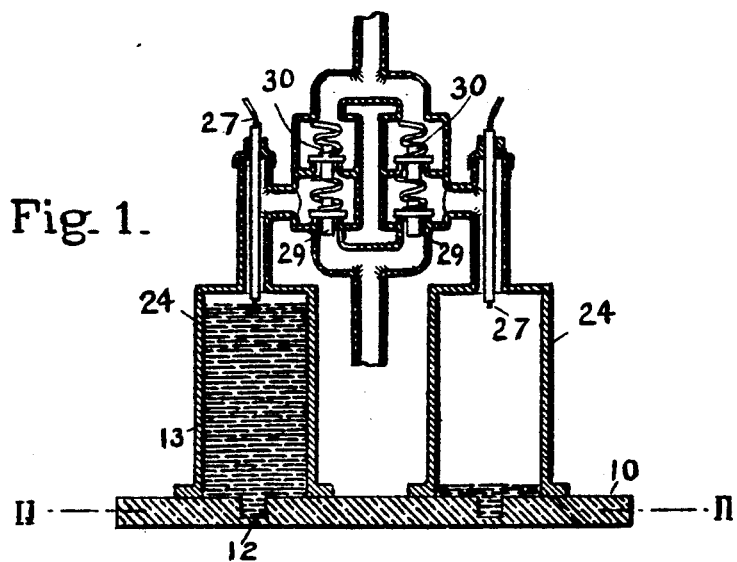
Figure 2:
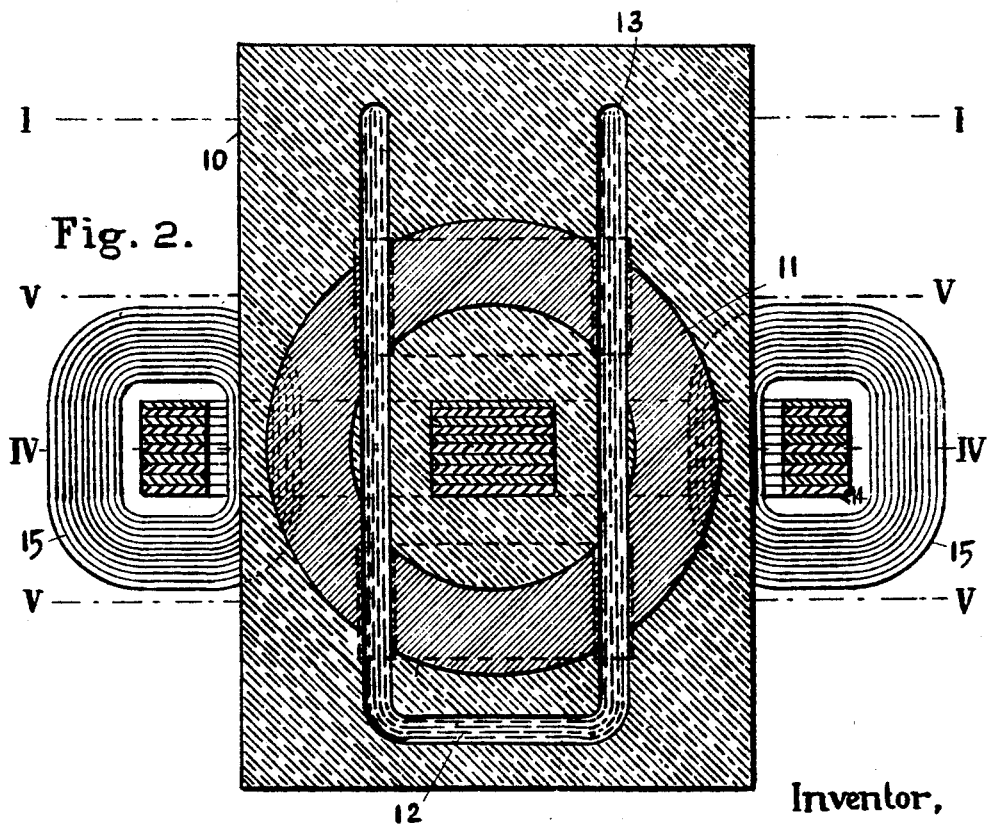
Fig. 2 is a section on the line II—II of Figs. 1, 4 and 5, showing the passageway for the mercury, the closed electric circuit across the mercury and the coils and transformer cores for inducing current in the circuit across the mercury.
Figure 3:
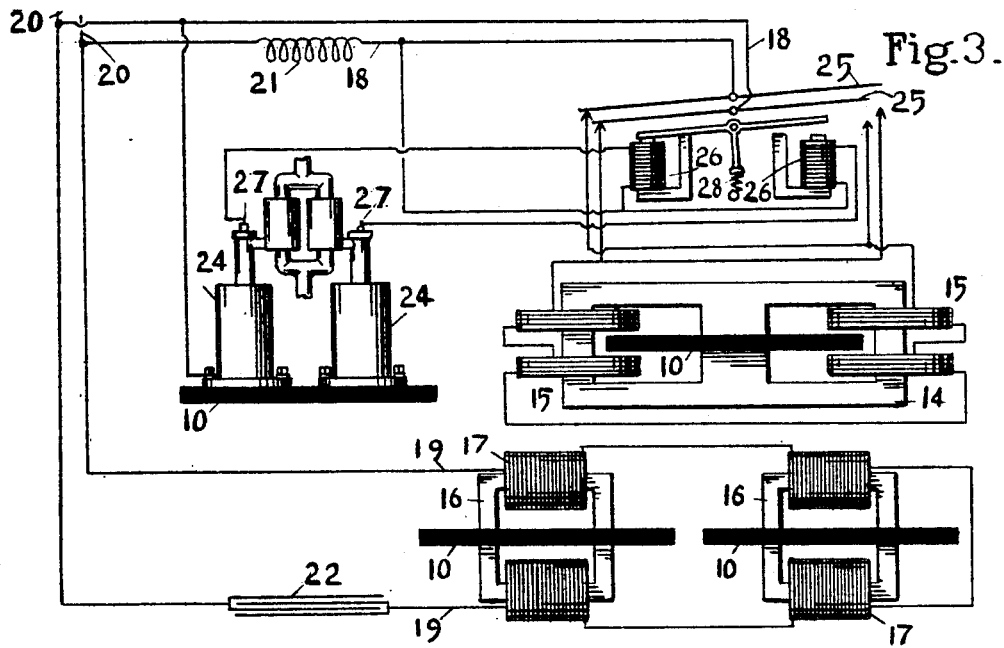
Fig. 3 is a diagram of the circuits.
Figure 4:
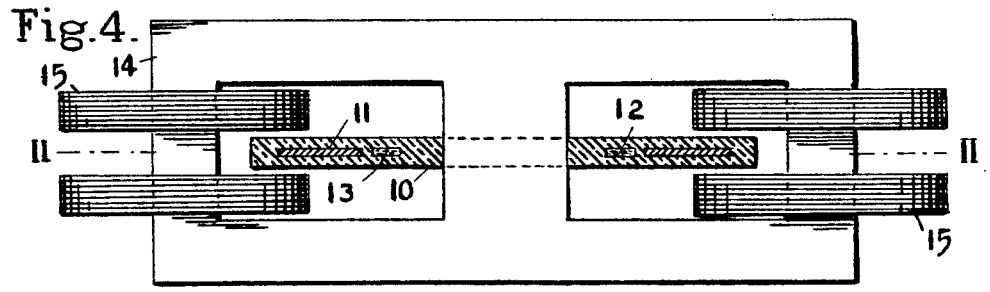
Fig. 4 is a section on the line IV—IV of Fig. 2, showing the transformer for energizing the circuit across the mercury.
Figure 5:
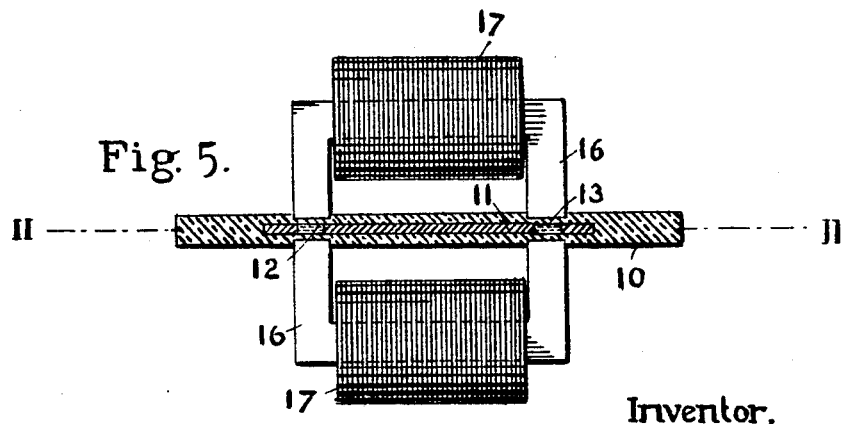
Fig. 5 is a section on the line V—V of Fig. 2, showing the means for creating a magnetic field at each point where the circuit crosses the mercury.
Figure 6:
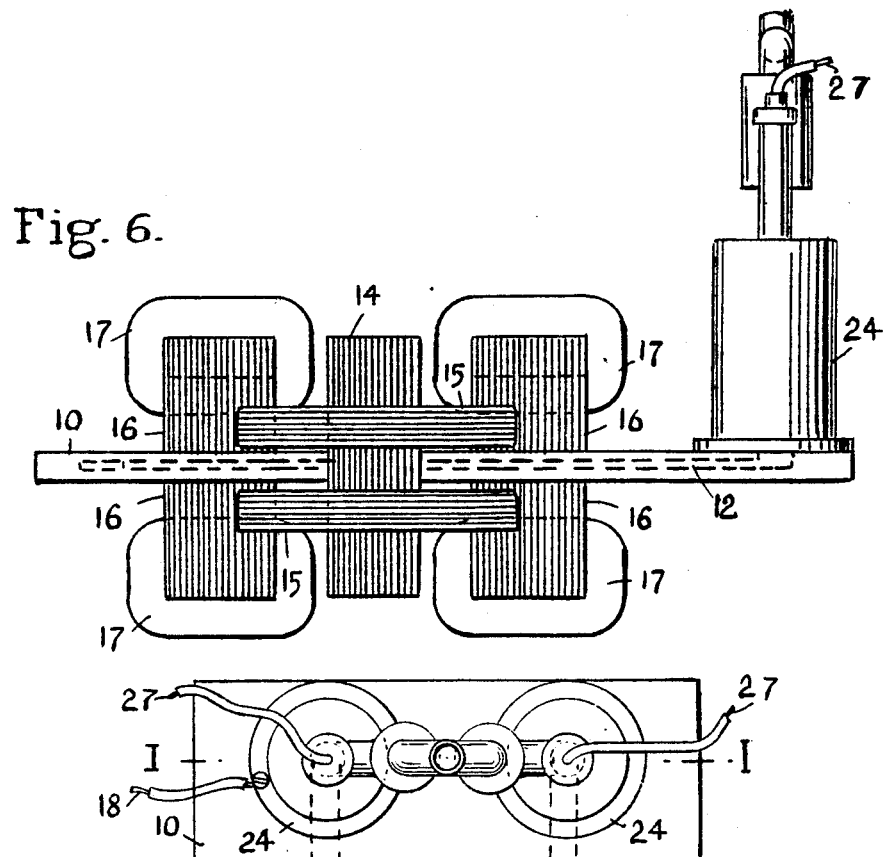
Fig. 6 is a side elevation.
Figure 7:
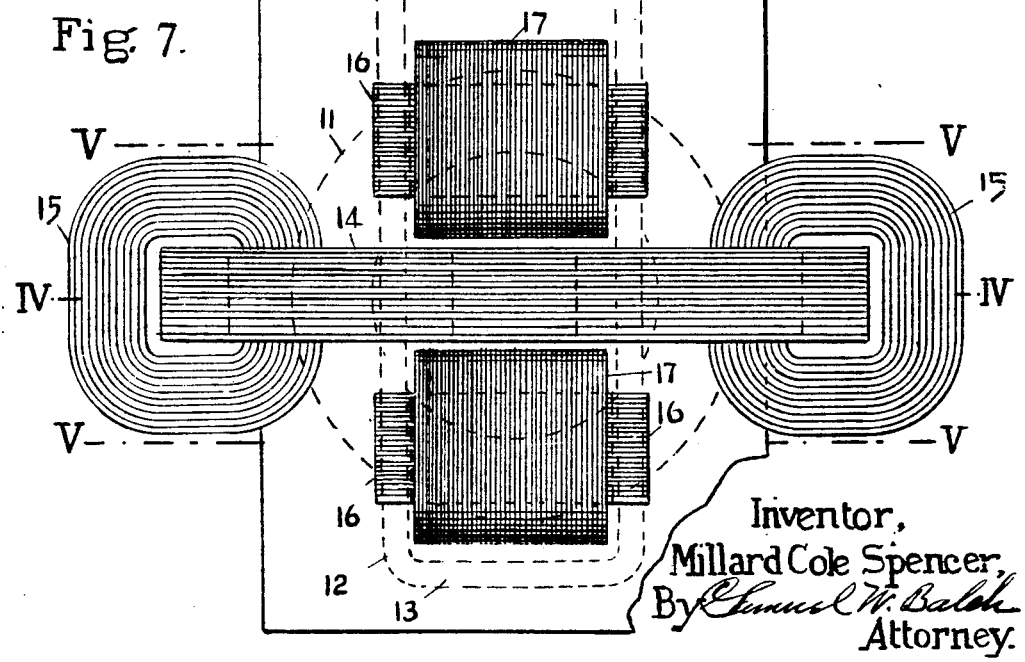
Fig. 7 is a plan.

Each of the sectional views shows only the apparatus at the section viewed in either direction.

A plate 10 of insulating material has set in it an annular sheet of copper 11. A passageway 12 in the plate cuts the annular sheet of copper at four points and separates it into four segments and is filled with mercury 13 or other electrically conducting fluid. At the crossing points this electrically connects the four copper segments and thereby forms a closed electrical circuit. Interlinked with this circuit is a transformer core 14 with induction windings 15, 15. The passageway for the mercury is of elongated cross section so that the plate of insulating material through which it passes may be as thin as possible.

On both sides of the plate are two sets of laminated magnet cores 16, 16, the poles of which face each other over the passageway at the points where the mercury in it serves to electrically connect the ends of the copper segments. The walls of the passageway are brought close together and the covering walls of insulating material are made as thin as practicable so that the gaps between the facing ends of the magnet cores may be reduced as much as possible. The magnet cores are magnetized by coils 17, 17, which are the exciting windings. Conductors 18, 18 and 19, 19 are a source of two-phase electromotive force which may be directly generated or derived as shown from single-phase alternating electromotive force on conductors 20, 20, the phase being split by retarding one part by a coil 21 and advancing the other part by condenser 22. One phase is supplied to the transformer coils and the other phase is supplied to the magnet coils.

It is a principle of electromagnetism that if a current of electricity traverses through a conducting body in a particular direction and a magnetic field is directed through the same part of the body at right angles to the direction of the electric current, then the body is acted upon by a force in a direction at right angles to both the direction of the electric current and the direction of the magnetic field. This applies equally to a conducting solid and a conducting liquid. If either the current or the field is reversed the direction of the force is reversed, and if the direction of the current and of the field are both reversed the direction of the force is not reversed. To apply this principle to the creation of a non-reversing force with alternating current and alternating magnetism the reversal of the electric current and of the magnetic field must be simultaneous. One may be displaced 180 degrees in phase with respect to the other and the reversal will still be simultaneous, but not if one is displaced 90 degrees with respect to the other.

When an alternating voltage is applied to the coils 15, 15, a magnetic flux is set up in core 14 which lags 90 degrees in phase behind the applied electromotive force. This magnetic flux in turn generates a voltage in the ring 11 which lags 90 degrees in phase behind the flux and sets up an electric current through the mercury which is in phase with the voltage and which lags 180 degrees in phase behind the voltage which is applied to the coils 15, 15.

When an alternating voltage is applied to the coils 17, 17, a magnetic flux is set up in core 16 and through the mercury which lags 90 degrees in phase behind the electromotive force which is applied to the coils 17, 17. In order to avoid a ninety-degree phase difference between the electric current through the mercury and the magnetic flux through the mercury it is necessary therefore to set up a phase difference of 90 degrees between the voltage applied to the coils 15, 15 and the voltage applied to the coils 17, 17, which as shown is conveniently obtained by retarding the phase of the voltage which is applied to the coils 15, 15 and advancing the phase of the voltage which is applied to the coils 17, 17 so as to make a total difference of 90 degrees in the phases of the two voltages.

In order to use the apparatus to pump a nonconducting fluid, chambers 24, 24 are provided at the ends of the passageway filled with mercury and enough additional mercury is provided to fill one of the chambers. The chambers and connecting piping are of metal and are connected to the conductor 18. The mercury is alternately pumped from one chamber to the other by periodically reversing the direction of the connections of one of the sets of coils, as shown, the transformer coils. This is effected by a reversing switch consisting of leaves 25, 25 which are operated by magnets 26, 26. These alternately receive current when the mercury rises in one or the other chamber and completes the circuit through one or the other of two electrodes 27, 27. These electrodes are covered wires which lead into the chambers and have their tips exposed to make contact with the mercury and thereby complete the connection from conductor 18 to one or the other of the magnets 26, 26 as required to throw the reversing switch. After the switch has been thrown and the contact at the electrode has broken, the switch is held in place by a compression spring 28. The nonconducting fluid to be pumped is admitted to the tops of the mercury pistons through inlet valves 29, 29, and is discharged through outlet valves 30, 30.

I claim:

1. A fluid conductor motor consisting of a plate of insulating material containing a passageway filled with an electrically conductive fluid, a two-phase source of electromotive force for the motor, a transformer having a single-turn secondary with its primary winding connected to one phase of the source of electromotive force and its secondary arranged to pass electric current through the fluid transverse to the direction of the passageway, a magnet core positioned for providing a magnetic field in the fluid at the point through which the current passes, and means for energizing the magnet core from the other phase of the source of electromotive force, whereby a force is set up in the fluid tending to move it in a direction at right angles to the direction of the electric current and the direction of the magnetic field.

2. A fluid conductor motor consisting of a plate of insulating material containing a passageway filled with an electrically conductive fluid, a two-phase source of electromotive force for the motor, a transformer having a single-turn secondary with its primary winding connected to one phase of the source of electromotive force and its secondary arranged to pass electric current through the fluid transverse to the direction of the passageway at a plurality of points, magnet cores positioned for providing magnetic fields in the fluid at the points through which the electric current passes, and means for energizing the magnet cores from the other phase of the source of electromotive force, whereby a force is set up in the fluid tending to move it in a direction at right angles to the directions of the electric current and the directions of the magnetic fields.

3. A fluid conductor motor consisting of a plate of insulating material containing a passageway filled with an electrically conductive fluid, a single-phase source of electromotive force supplied to two branch circuits constituting two-phase sources for the motor, a transformer having its primary energized from one of the branch circuits and having its secondary arranged to pass electric current through the fluid transverse to the direction of the passageway, a magnet energized from the other branch circuit and having its core positioned to induce an alternating magnetic field in the fluid at the point through which the electric current passes, and means for displacing the phases of the currents in the branch circuits with respect to each other, whereby the magnetic field is brought into phase with the electric current through the fluid.

4. A fluid conductor motor consisting of a plate of insulating material containing a passageway filled with an electrically conductive fluid, a single-phase source of electromotive force supplied to two branch circuits constituting two phase sources for the motor, a transformer with a single turn secondary having its primary energized from one of the branch circuits and having its secondary arranged to pass electric current through the fluid transverse to the direction of the passageway, a magnet energized from the other branch circuit and having its core positioned to induce an alternating magnetic field in the fluid at the point through which the electric current passes, and means for displacing the phases of the currents in the branch circuits with respect to each other, whereby the magnetic field is brought into phase with the electric current through the fluid.

5. A fluid conductor motor consisting of a transformer with a laminated core having a secondary winding closed on itself and a primary winding, a plate of insulating material containing a passageway filled with an electrically conductive fluid cutting through the secondary winding at a point where current is induced in the winding, a magnet having its core positioned for inducing an alternating magnetic field in the fluid at the point where it cuts through the secondary winding, and sources of electromotive force supplied to the primary of the transformer and to the magnet in proper phase whereby electric current and a magnetic field in phase are caused to pass across the fluid at the point where it forms a part of the secondary of the transformer.

6. A fluid conductor motor consisting of a transformer with a laminated core having a single turn secondary winding closed on itself and a primary winding, a plate of insulating material containing a passageway filled with an electrically conductive fluid cutting through the secondary winding at a plurality of points where current is induced in the winding, a magnet having its cores positioned for inducing alternating magnetic fields in the fluid at the points where it cuts through the secondary winding, and sources of electromotive force supplied to the primary of the transformer and to the magnet in proper phase whereby an electric current and magnetic fields in phase are caused to pass across the fluid at the points where it forms a part of the secondary of the transformer.

MILLARD COLE SPENCER.